(12) United States Patent
Hwang et al.

(10) Patent No.: US 11,880,264 B2
(45) Date of Patent: Jan. 23, 2024

(54) BMS RECOGNITION SYSTEM AND METHOD

(71) Applicant: LG CHEM, LTD., Seoul (KR)

(72) Inventors: Ji-Won Hwang, Daejeon (KR); Chang-Hyun Sung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 551 days.

(21) Appl. No.: 17/257,726

(22) PCT Filed: Dec. 17, 2019

(86) PCT No.: PCT/KR2019/017891
§ 371 (c)(1),
(2) Date: Jan. 4, 2021

(87) PCT Pub. No.: WO2020/130576
PCT Pub. Date: Jun. 25, 2020

(65) Prior Publication Data
US 2021/0286664 A1  Sep. 16, 2021

(30) Foreign Application Priority Data
Dec. 20, 2018  (KR) .................. 10-2018-0166763

(51) Int. Cl.
*G06F 11/07* (2006.01)
*H02J 7/00* (2006.01)

(52) U.S. Cl.
CPC ...... *G06F 11/0736* (2013.01); *G06F 11/0751* (2013.01); *G06F 11/0772* (2013.01);
(Continued)

(58) Field of Classification Search
USPC .................. 320/130, 132, 134, 136, 138
See application file for complete search history.

(56) References Cited

U.S. PATENT DOCUMENTS 5,606,242 A * 2/1997 Hull ............... H02J 7/00036
429/432
5,963,010 A  10/1999 Hayashi et al.
(Continued)

FOREIGN PATENT DOCUMENTS

CN  102097844 A  6/2011
CN  104377750 A  2/2015
(Continued)

OTHER PUBLICATIONS

Office Action dated Mar. 17, 2022, issued by the Korean Intellectual Property Office in corresponding Korean Patent Application No. 10-2018-0166763.
(Continued)

*Primary Examiner* — Brian Ngo
(74) *Attorney, Agent, or Firm* — Morgan, Lewis & Bockius LLP

(57) ABSTRACT

A battery management system (BMS) recognition system, comprising: a master BMS including a master light emitter, the master BMS being configured to flicker the master light emitter to transmit an operation mode shifting signal to a slave BMS when it is intended to shift an operation mode of the slave BMS; and a slave BMS including a slave light receiver configured to correspond to the master light emitter, the slave BMS being configured to: recognize the flickering of the master light emitter through the slave light receiver; and shift the operation mode thereof in response to the operation mode shifting signal.

20 Claims, 2 Drawing Sheets

(52) U.S. Cl.
CPC ........ *H02J 7/0013* (2013.01); *H02J 7/00032* (2020.01); *G06F 2218/12* (2023.01)

(56) References Cited

U.S. PATENT DOCUMENTS

| | | | |
|---|---|---|---|
| 2009/0066291 | A1 | 3/2009 | Tien et al. |
| 2012/0086404 | A1 | 4/2012 | Lim |
| 2012/0268069 | A1 | 10/2012 | Park et al. |
| 2013/0127626 | A1 | 5/2013 | Yoo |
| 2014/0210420 | A1 | 7/2014 | Lee et al. |
| 2015/0048779 | A1 | 2/2015 | Lee |
| 2015/0280462 | A1 | 10/2015 | Ohtsuki et al. |
| 2016/0261124 | A1 | 9/2016 | Kang et al. |
| 2016/0261125 | A1 | 9/2016 | Kang et al. |
| 2016/0380442 | A1 | 12/2016 | Kang et al. |
| 2018/0224506 | A1 | 8/2018 | Kurosaki |
| 2018/0316207 | A1 | 11/2018 | Irish et al. |
| 2020/0254354 | A1* | 8/2020 | Binder ................. H04R 1/028 |

FOREIGN PATENT DOCUMENTS

| | | | | |
|---|---|---|---|---|
| CN | 104428975 | A | 3/2015 | |
| CN | 104871394 | A | 8/2015 | |
| JP | 9-129272 | A | 5/1997 | |
| JP | 2008-139261 | A | 6/2008 | |
| JP | 2010049814 | | * 3/2010 | |
| JP | 2013-541314 | A | 11/2013 | |
| JP | 2014-143771 | A | 8/2014 | |
| JP | 2015-527047 | A | 9/2015 | |
| JP | 2015-192579 | A | 11/2015 | |
| KR | 10-1147205 | B1 | 5/2012 | |
| KR | 10-2013-0055156 | A | 5/2013 | |
| KR | 10-2013-0101457 | A | 9/2013 | |
| KR | 10-2014-0072323 | A | 6/2014 | |
| KR | 10-1480090 | B1 | 1/2015 | |
| KR | 10-2017-0056061 | A | 5/2017 | |
| KR | 20170062757 | | * 6/2017 | |
| KR | 10-2017-0116377 | A | 10/2017 | |
| KR | 20170116377 | | * 10/2017 | |
| KR | 10-2018-0103081 | A | 9/2018 | |
| WO | WO-2012037434 | A1 * | 3/2012 | ............ H02J 7/0068 |
| WO | 2017/056411 | A1 | 4/2017 | |
| WO | WO-2018066728 | A1 * | 4/2018 | |

OTHER PUBLICATIONS

International Search Report issued in corresponding International Patent Application No. PCT/KR2019/017891, dated Apr. 3, 2020.
Office Action dated Jan. 18, 2022 issued by the Japanese Patent Office for corresponding Japanese Patent Application No. 2020-564754.
Office Action dated Nov. 11, 2022, issued in corresponding Indian Patent Application No. 202117009771.
Office Action dated Aug. 11, 2023, issued in corresponding Chinese Patent Application No. 201980035447.3.

* cited by examiner

BMS RECOGNITION SYSTEM AND METHOD

TECHNICAL FIELD

The present application claims priority to Korean Patent Application No. 10-2018-0166763 filed on Dec. 20, 2018 in the Republic of Korea, the disclosures of which are incorporated herein by reference.

The present disclosure relates to a BMS recognition system and method, and more particularly, to a BMS recognition system and method for effectively recognizing a master BMS and a slave BMS in a battery pack having a plurality of BMSs.

BACKGROUND ART

In recent years, the demand for portable electronic products such as notebook computers, video cameras and portable phones has increased sharply, and the electric vehicles, energy storage batteries, robots and satellites has been active developed. Accordingly, high-performance secondary batteries allowing repeated charging and discharging are being actively studied.

Secondary batteries commercially available at present include nickel-cadmium batteries, nickel-hydrogen batteries, nickel-zinc batteries, lithium secondary batteries and the like. Among them, the lithium secondary batteries have almost no memory effect compared to nickel-based secondary batteries and thus are in the limelight due to advantageous of free charging and discharging, low self-discharge rate and high energy density.

Batteries are used in a wide variety of applications, and large capacities are often required for devices such as electric-driven vehicles or smart grid systems to which batteries are frequently utilized. In order to increase the capacity of the battery, the capacity of the secondary battery, namely the capacity of a battery cell itself, may be increased. However, in this case, the capacity increase effect is not large and there is a physical limitation on the size expansion of the secondary battery. Thus, generally, a battery pack in which a plurality of battery modules are connected in series and in parallel is widely used.

Meanwhile, as the need for a large capacity structure of a battery pack increases, recently, a demand for a battery pack having a multi-module structure in which a plurality of battery modules, in each of which includes a plurality of batteries connected in series and/or in parallel, are aggregated is increasing.

Since the battery pack having the multi-module structure includes a plurality of batteries, there is a limit to control the charge/discharge states of all the batteries using a single BMS. Thus, recently, a BMS is installed in each battery module included in the battery pack, so that one of the BMSs is designated as a master BMS and the remaining BMSs are designated as slave BMSs. Then, the charge and discharge of each battery module is controlled by the master-slave method.

In the master-slave method, the master BMS communicates with the slave BMSs in order to collectively manage the charge and discharge of the battery modules included in the battery pack. Here, the master BMS collects various charge/discharge monitor data regarding the battery modules managed by the slave BMSs or transmits a control command for controlling the charging/discharging operation of each battery module to the corresponding slave BMS.

Conventionally, when the master BMS wants to shift an operation mode of the slave BMS, the master BMS generally reads identification information of the slave BMS using a wired or wireless communication network and then shift the operation mode of each slave BMS by a program algorithm.

However, the conventional method has a disadvantage in that a hardware circuit for storing the identification information is separately required and a high-performance processor is required to execute the complex software algorithm.

DISCLOSURE

Technical Problem

The present disclosure is designed to solve the problems of the related art, and therefore the present disclosure is directed to providing an improved BMS recognition system and method, which may effectively recognize a master BMS and a slave BMS in a battery pack having a plurality of BMSs.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a BMS recognition system, comprising: a master BMS having a master light emitting unit, the master BMS being configured to flicker the master light emitting unit to transmit an operation mode shifting signal to a slave BMS when it is intended to shift an operation mode of the slave BMS; and a slave BMS having a slave light receiving unit configured to correspond to the master light emitting unit, the slave BMS being configured to recognize the flickering of the master light emitting unit through the slave light receiving unit and shift the operation mode thereof in response to the operation mode shifting signal.

The master BMS may include a plurality of master light emitting units configured to correspond to slave light receiving units of a plurality of slave BMSs, respectively, and the master BMS may be configured to flicker at least one master light emitting unit among the plurality of master light emitting units to transmit the operation mode shifting signal to a corresponding slave BMS.

The slave BMS may include a slave light emitting unit, and when it is intended to transmit a failure situation to the master BMS since the failure situation occurs, the slave BMS may be configured to flicker the slave light emitting unit to transmit the failure situation to the master BMS.

The master BMS may include a master light receiving unit configured to correspond to the slave light emitting unit, and the master BMS may be configured to recognize the flickering of the slave light emitting unit through the master light receiving unit to perceive the failure situation of the slave BMS.

The master BMS may include a plurality of master light emitting units configured to correspond to slave light receiving units of a plurality of slave BMSs, respectively.

The plurality of master light emitting units may be allocated with identification information to correspond to mounted locations of the plurality of slave BMSs.

The master BMS may be configured to flicker the plurality of master light emitting units sequentially to allocate the identification information to the plurality of slave BMSs sequentially.

The master BMS may be configured to flicker the master light emitting unit to transmit an operation mode shifting signal including the identification information to the slave BMS.

The slave BMS may be configured to check whether the identification information included in the operation mode shifting signal received through the slave light receiving unit is identical to the allocated identification information, and shift the operation mode in response to the operation mode shifting signal based on the checking result.

The slave BMS may include a slave light emitting unit configured to correspond to a slave light receiving unit of an adjacent slave BMS, and when recognizing the flickering of the master light emitting unit and shifting the operation mode thereof in response to the operation mode shifting signal, the slave BMS may be configured to flicker the slave light emitting unit to apply an operation mode shifting signal to the adjacent slave BMS in a relay manner.

A battery pack according to another aspect of the present disclosure may comprise the recognizing system according to an aspect of the present disclosure.

A vehicle according to still another aspect of the present disclosure may comprise the recognizing system according to an aspect of the present disclosure.

A BMS recognition method according to still another aspect of the present disclosure may comprise: when it is intended to shift an operation mode of a slave BMS, transmitting an operation mode shifting signal to the slave BMS by flickering a master light emitting unit; and recognizing the flickering of the master light emitting unit through a slave light receiving unit configured to correspond to the flickering of the master light emitting unit, and shifting the operation mode in response to the operation mode shifting signal.

The step of transmitting an operation mode shifting signal may include transmitting an operation mode shifting signal to at least one slave BMS by flickering at least one master light emitting unit among a plurality of master light emitting units configured to correspond to slave light receiving units of a plurality of slave BMSs, respectively.

Advantageous Effects

According to an aspect of the present disclosure, for a plurality of BMSs, the operation mode of the slave BMS may be effectively shifted even though the master BMS does not receive information in advance from the slave BMS or no additional hardware for shifting the operation mode is provided.

According to another aspect of the present disclosure, since communication interference does not occur between the master BMS and the slave BMS, it is possible to prevent a delay in shifting the operation mode due to a time delay that may be caused by the communication interference.

According to another aspect of the present disclosure, the safety of BMS recognition may be improved through signal transmission according to instant light emission and light reception.

The present disclosure may have various effects other than the above, and other effects of the present disclosure may be understood from the following description and more clearly figured out by the embodiments of the present disclosure.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Further, in describing the present disclosure, if it is determined that a detailed description of a related known structure or function may obscure the subject matter of the present disclosure, the detailed description will be omitted.

Throughout the specification, when a portion is referred to as "comprising" or "including" any element, it means that the portion may include other elements further, without excluding other elements, unless specifically stated otherwise. Furthermore, the term "processor" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

In the specification, a battery cell 10 means one independent cell that has a cathode terminal and an anode terminal and is physically separable. For example, one pouch-type lithium polymer cell may be considered as a battery cell 10.

A BMS recognition system according to an embodiment of the present disclosure may be a system that recognizes a BMS provided in a battery pack. For example, the battery pack according to an embodiment of the present disclosure may be provided in a vehicle. In addition, the battery pack according to an embodiment of the present disclosure may include a plurality of BMSs.

The battery pack according to an embodiment of the present disclosure may include a master BMS 100 and a slave BMS 200.

Figure 1:
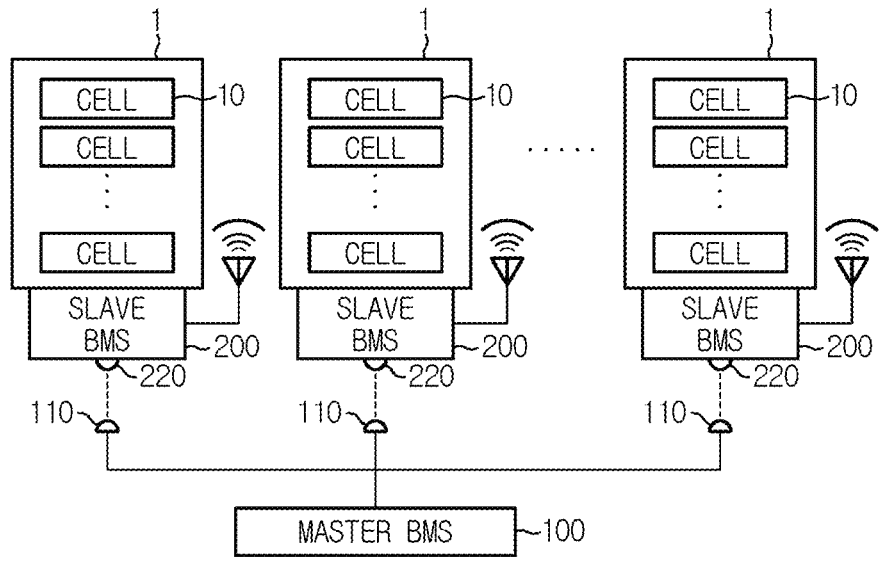
FIG. 1 is a diagram schematically showing the configuration of a BMS recognition system according to an embodiment of the present disclosure.

FIG. 1 is a diagram schematically showing the configuration of a BMS recognition system according to an embodiment of the present disclosure.

For example, as shown in FIG. 1, the battery pack according to an embodiment of the present disclosure may include a plurality of battery modules 1. In addition, the plurality of battery modules 1 may include a plurality of battery cells 10 connected in series and/or in parallel with each other.

The plurality of BMSs provided in the BMS recognition system according to an embodiment of the present disclosure may be the same BMS (Battery Management System) to which an algorithm for allocating an identifier according to the present disclosure is applied.

For example, the plurality of BMSs according to an embodiment of the present disclosure may be BMSs having the same configuration in hardware and software. In addition, each of the plurality of BMS may control at least one battery cell 10 in charge thereof. The control functions of the plurality of BMSs may include charge/discharge control of the battery cell 10, equalization control, switching, measurement and monitoring of electrical characteristic values, fault indication, on/off control, and state of charge (SOC) estimation, and the like.

In addition, the plurality of BMSs may transmit and receive electrical signals using a wired or wireless communication network. Preferably, the communication network connecting the plurality of BMSs to each other may be a Bluetooth, Wi-Fi or CAN (Controller Area Network) communication network.

Preferably, each of the plurality of slave BMSs according to an embodiment of the present disclosure may include a processor and a memory device.

The processor may perform each operation of the BMS recognition system according to an embodiment of the present disclosure. In addition, the memory device may store information necessary for the operation of the BMS recognition system according to an embodiment of the present disclosure in advance.

Meanwhile, the processor may be implemented to include a processor, an application-specific integrated circuit (ASIC), another chipset, a logic circuit, a register, a communication modem, and/or a data processing device, selectively.

Meanwhile, the memory device is not particularly limited as long as it serves as a storage medium capable of recording and erasing data. For example, the memory device may be RAM, ROM, a register, a hard disk, an optical recording medium, or a magnetic recording medium. The memory device may also be electrically connected to the processor, for example, via a data bus or the like so as to be accessed by the processor. The memory device may also store and/or update and/or erase and/or transmit data generated when a program including various control logics performed in the processor and/or a control logic is executed.

Referring to FIG. 1, the BMS recognition system according to an embodiment of the present disclosure includes a master BMS 100 and at least one slave BMS 200.

The master BMS 100 may include a master light emitting unit 110. For example, as shown in FIG. 1, the master BMS 100 may include a master light emitting unit 110 having a light emitting element. For example, the master light emitting unit 110 may be electrically connected to the master BMS 100 to send and receive an electrical signal and emit light based on the electrical signal received from the master BMS 100. For example, the light emitting device may be implemented as a light emitting diode.

In addition, if the master BMS 100 is to shift an operation mode of the slave BMS 200, the master BMS 100 may flicker the master light emitting unit 110 to transmit an operation mode shifting signal to the slave BMS 200.

For example, in the embodiment of FIG. 1, the master BMS 100 may flicker the master light emitting unit 110 corresponding to the slave BMS 200 of which the operation mode is to be shifted, thereby transmitting the operation mode shifting signal to the slave BMS 200.

Here, the operation mode shifting signal may be a signal that awakens a BMS in a sleep state. Alternatively, the operation mode shifting signal may be a signal that shifts a BMS in an awake state into a sleep state.

The slave BMS 200 may include a slave light receiving unit 220 configured to correspond to the flickering of the master light emitting unit 110.

For example, as shown in FIG. 1, each slave BMS 200 may include a slave light receiving unit 220 having a light receiving element. In addition, the slave light receiving unit 220 may be electrically connected to the slave BMS 200 to send and receive an electrical signal and transmit an electrical signal to the slave BMS 200 in response to the flickering of the master light emitting unit 110. For example, the light receiving element may be implemented as a light receiving diode.

In addition, the slave BMS 200 may recognize that the master light emitting unit 110 is turned on through the slave light receiving unit 220 and shift the operation mode in response to the operation mode shifting signal.

For example, as shown in FIG. 1, the slave BMS 200 may recognize that the master light emitting unit 110 corresponding to each slave light receiving unit 220 is turned on.

If the corresponding master light emitting unit 110 is turned on, each of the slave light receiving units 220 may transmit an electrical signal to the slave BMS 200 based thereon. In addition, if receiving the electrical signal through the slave light receiving unit 220, the slave BMS 200 may shift the operation mode. For example, the operation mode may include a sleep mode and an awake mode.

Preferably, the master BMS 100 according to an embodiment of the present disclosure may include a plurality of master light emitting units 110 configured to correspond to the slave light receiving units 220 of a plurality of slave BMSs 200.

For example, as shown in FIG. 1, the master BMS 100 may include a plurality of master light emitting units 110 corresponding to the number of the plurality of slave BMSs 200 to correspond to the slave light receiving units 220 of the plurality of slave BMSs 200. In this case, the plurality of master light emitting units 110 may be disposed at locations corresponding to the slave light receiving units 220, respectively.

In addition, the master BMS 100 may flicker at least one master light emitting unit 110 among the plurality of master light emitting units 110 to transmit the operation mode shifting signal to at least one slave BMS 200.

For example, as shown in FIG. 1, the master BMS 100 may determine a slave BMS 200 of which the operation mode is to be shifted. Subsequently, the master BMS 100 may flicker the master light emitting unit 110 corresponding to the slave light receiving unit 220 connected to the target slave BMS 200 of which the operation mode is to be shifted.

Preferably, identification information may be allocated to the plurality of master light emitting units 110 to correspond to the mounted locations of the plurality of slave BMSs 200.

For example, as shown in FIG. 1, identification information may be sequentially assigned to the plurality of master light emitting units 110 to correspond to the mounted locations of the plurality of slave BMSs 200. For example, the identification information may include sequential numeric information from 1 to N for the N number of slave BMSs 200.

More preferably, the master BMS 100 according to an embodiment of the present disclosure may sequentially flicker the plurality of master light emitting units 110 to sequentially allocate identification information to the plurality of slave BMSs 200.

For example, as shown in FIG. 1, the master BMS 100 may flicker the plurality of master light emitting units 110 sequentially based on the identification information. In this case, the master BMS 100 may transmit the identification information to each slave BMS 200 that has received an electrical signal from the slave light receiving unit 220 through wired or wireless communication.

Meanwhile, the master BMS 100 may transmit the operation mode shifting signal including the identification information to at least one slave BMS 200 by flickering at least one master light emitting unit 110 among the plurality of master light emitting units 110 so that the operation mode shifting signal including the allocated identification information is transmitted.

The slave BMS 200 may receive the operation mode shifting signal by recognizing that the master light emitting unit 110 is turned on through the slave light receiving unit 220, and check whether the identification information included in the operation mode shifting signal is identical to identification information allocated previously.

If the identification information included in the received operation mode shifting signal is identical to the previously allocated identification information, the slave BMS 200 may shift the operation mode in response to the operation mode shifting signal. Conversely, if the identification information included in the transmitted operation mode shifting signal is not identical to the previously allocated identification information, the slave BMS 200 may not shift the operation mode.

Figure 2:
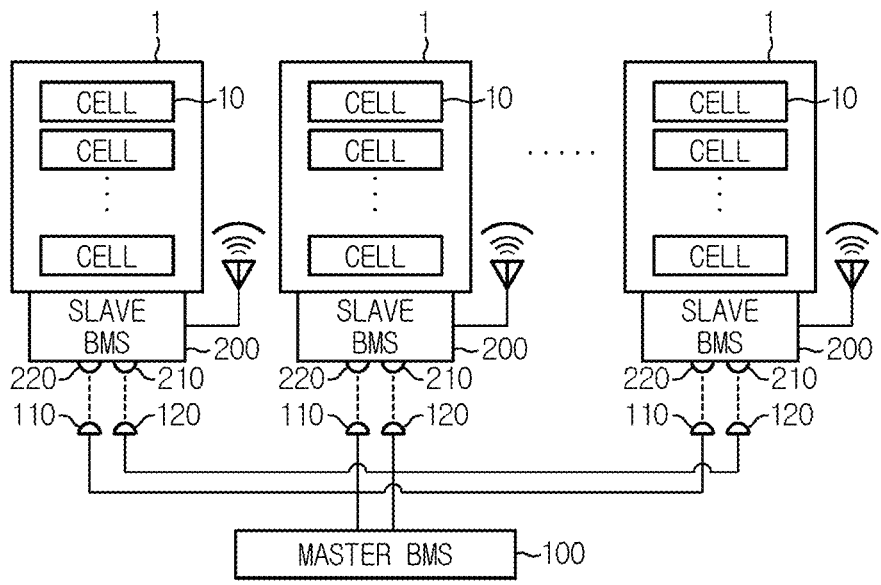
FIG. 2 is a diagram schematically showing the configuration of a BMS recognition system according to another embodiment of the present disclosure.

FIG. 2 is a diagram schematically showing the configuration of a BMS recognition system according to another embodiment of the present disclosure.

Referring to FIG. 2, a BMS recognition system according to an embodiment of the present disclosure may include a master BMS 100 and a slave BMS 200.

Preferably, the slave BMS 200 according to an embodiment of the present disclosure may include a slave light emitting unit 210. For example, as shown in FIG. 2, the slave BMS 200 according to an embodiment of the present disclosure may include a slave light emitting unit 210 having a light emitting element. For example, the slave light emitting unit 210 may be electrically connected to the slave BMS 200 to send and receive an electrical signal and emit light based on the electrical signal received from the slave BMS 200. For example, the light emitting device may be implemented as a light emitting diode.

More preferably, the master BMS 100 according to an embodiment of the present disclosure may include a master light receiving unit 120 configured to correspond to the flickering of the slave light emitting unit 210.

For example, as shown in FIG. 2, the master BMS 100 according to an embodiment of the present disclosure may include a master light receiving unit 120 having a light receiving element. In addition, the master light receiving unit 120 may be electrically connected to the master BMS 100 to send and receive an electrical signal, and transmit an electrical signal to the master BMS 100 in response to the flickering of the slave light emitting unit 210. For example, the light receiving element may be implemented as a light receiving diode.

Preferably, the master BMS 100 according to an embodiment of the present disclosure may include a master light emitting unit 110 and a master light receiving unit 120. For example, the master light emitting unit 110 and the master light receiving unit 120 may be respectively disposed at locations corresponding to each slave BMS 200.

Preferably, the slave BMS 200 according to an embodiment of the present disclosure may include a slave light emitting unit 210 and a slave light receiving unit 220.

For example, the master light emitting unit 110 and the slave light receiving unit 220 may be disposed at locations corresponding to each other and transmit an electrical signal to the slave BMS 200 to which the corresponding slave light receiving unit 220 is connected according to the flickering of the master light emitting unit 110.

In addition, the master light receiving unit 120 and the slave light emitting unit 210 may be disposed at locations corresponding to each other so that the corresponding master light receiving unit 120 transmits an electrical signal to the master BMS 100 according to the flickering of the slave light emitting unit 210.

In addition, if a failure situation occurs and thus the slave BMS 200 intends to transmit the failure situation to the master BMS 100, the slave BMS 200 may flicker the slave light emitting unit 210 to transmit the failure situation to the master BMS 100.

For example, as shown in FIG. 2, if a failure situation such as overcharging or overdischarging occurs at the battery module, the slave BMS 200 according to an embodiment of the present disclosure may flicker the slave light emitting unit 210 to transmit the failure situation to the master BMS 100.

In addition, the master BMS 100 may perceive the failure situation of the slave BMS 200 by recognizing that the slave light emitting unit 210 is turned on through the master light receiving unit 120. In this case, the master BMS 100 may receive the type and content of the failure situation from the slave BMS 200 through a wired or wireless communication network.

Figure 3:
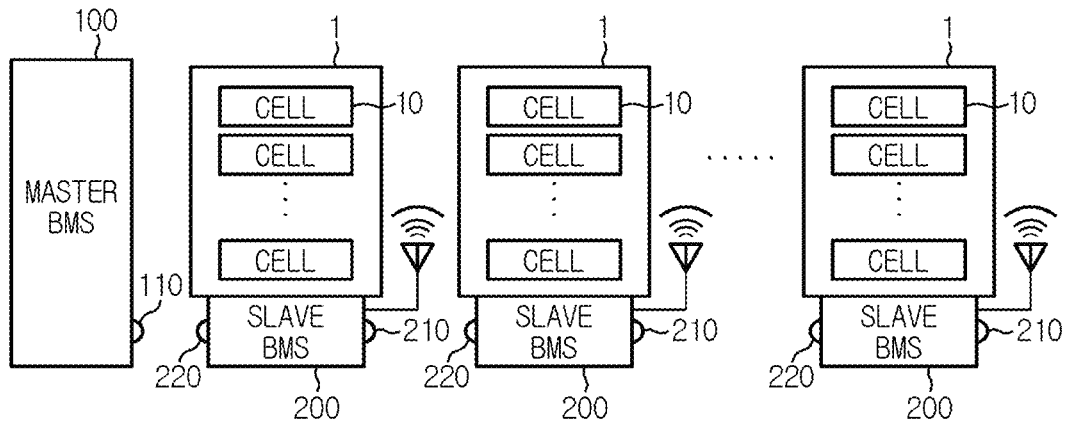
FIG. 3 is a diagram schematically showing the configuration of a BMS recognition system according to still another embodiment of the present disclosure.

FIG. 3 is a diagram schematically showing the configuration of a BMS recognition system according to still another embodiment of the present disclosure.

Referring to FIG. 3, the BMS recognition system according to an embodiment of the present disclosure may include a master BMS 100 and a slave BMS 200.

Preferably, the slave BMS 200 according to an embodiment of the present disclosure may include a slave light emitting unit 210 configured to correspond to a slave light receiving unit 220 of an adjacent slave BMS 200.

For example, as shown in FIG. 3, the slave BMS 200 according to an embodiment of the present disclosure may include a slave light receiving unit 220 and a slave light emitting unit 210, respectively. In addition, the slave light receiving unit 220 may be disposed at a location corresponding to the slave light emitting unit 210 of the adjacent slave BMS 200. In addition, each slave light emitting unit 210 may be disposed at a location corresponding to the slave light receiving unit 220 of the adjacent slave BMS 200.

In addition, if the slave BMS 200 recognizes that the master light emitting unit 110 is turned on and shifts its operation mode in response to the operation mode shifting signal, the slave BMS 200 may flicker the slave light emitting unit 210 to apply the operation mode shifting signal to the adjacent slave BMS 200 in a relay manner.

For example, as shown in FIG. 3, the master BMS 100 according to an embodiment of the present disclosure may transmit the operation mode shifting signal to the slave light receiving unit 220 mounted to the adjacent slave BMS 200 by flickering the master light emitting unit 110. Subsequently, the slave BMS 200 may shift its operation mode in response to the operation mode shifting signal. In addition, the slave BMS 200 may flicker the slave light emitting unit 210 to apply the operation mode shifting signal to the adjacent slave BMS 200 in a relay manner.

The BMS recognition system according to the present disclosure may be a component of a battery pack including a plurality of battery cells. Here, the battery pack may include at least one secondary battery, the BMS recognition system, electrical equipment (having a relay, a fuse, etc.), and a case. The plurality of battery cells may be classified into the N number of cell groups, and the cell groups may be respectively coupled with the N number of BMSs in a one-to-one relationship. It is obvious that the battery cells in each cell group may be connected in series and/or in parallel.

In addition, the BMS recognition system according to the present disclosure may be a component of a battery-powered system including a battery and a load powered therefrom. Examples of the battery-powered systems include a vehicle, an electric vehicle (EV), a hybrid electric vehicle (HEV), an electric bicycle (E-Bike), a power tool, an energy storage system, an uninterruptible power source (UPS), a portable computer, a portable telephone, a portable audio device, a portable video device, and the like. Also, examples of the load include a motor for providing a rotational force with the power supplied by the battery, or a power conversion circuit for converting the power supplied by the battery into a power required by various circuit components.

Figure 4:
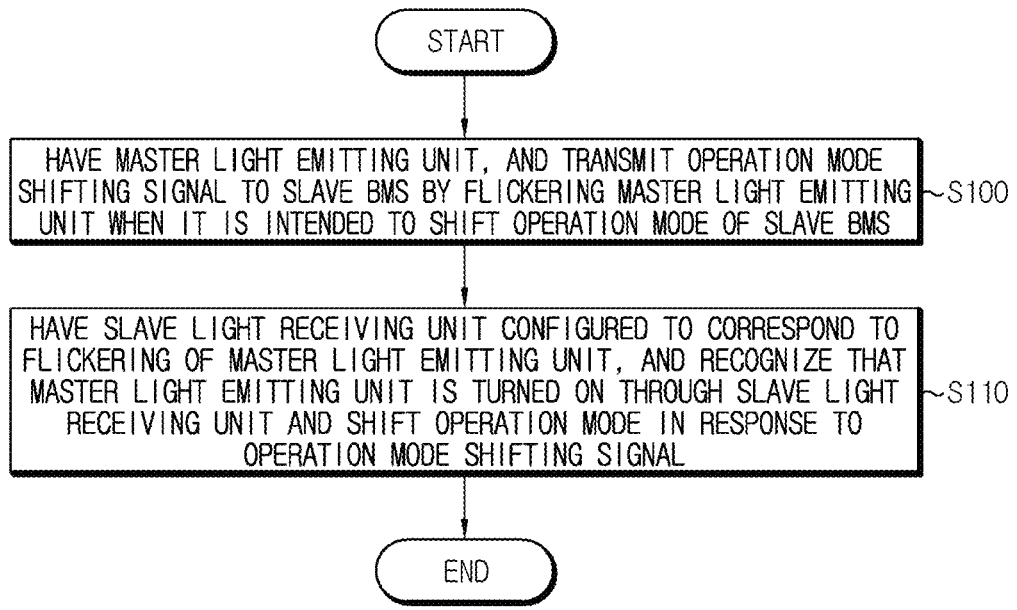
FIG. 4 is a flowchart schematically showing a BMS recognition method according to an embodiment of the present disclosure.

FIG. 4 is a flowchart schematically showing a BMS recognition method according to an embodiment of the present disclosure. In FIG. 4, a subject of each step may be each component of the BMS recognition system according to the present disclosure described above.

As shown in FIG. 4, the BMS recognition method according to the present disclosure includes an operation mode shifting signal transmitting step (S100) and an operation mode shifting step (S110).

The operation mode shifting signal transmitting step (S100) is a step of transmitting an operation mode shifting signal to the slave BMS 200 by flickering the master light emitting unit 110 when the operation mode of the slave BMS 200 is to be shifted, and this step may be performed by the master BMS 100.

The master BMS 100 may transmit the operation mode shifting signal to the slave BMS 200 of which the operation mode is to be shifted by flickering the master light emitting unit 110 connected thereto.

The operation mode shifting step (S110) is a step of recognizing that the master light emitting unit 110 is turned on through the slave light receiving unit 220 configured to correspond to the flickering of the master light emitting unit 110 and shifting the operation mode in response to the operation mode shifting signal, and this step may be performed by the slave BMS 200.

Preferably, in the operation mode shifting signal transmitting step (S100) according to an embodiment of the present disclosure, the master BMS 100 may include a plurality of master light emitting units 110 configured to correspond to the slave light receiving units 220 of the plurality of slave BMSs 200, respectively, and the master BMS 100 may flicker at least one master light emitting unit 110 among the plurality of master light emitting units 110 to transmit an operation mode shifting signal to at least one slave BMS 200.

Preferably, in the operation mode shifting step (S110) according to an embodiment of the present disclosure, the slave BMS 200 may include a slave light emitting unit 210 configured to correspond to a slave light receiving unit 220 of an adjacent slave BMS 200. In addition, if the slave BMS 200 recognizes that the master light emitting unit 110 is turned on and shifts its operation mode in response to the operation mode shifting signal, the slave BMS 200 may flicker the slave light emitting unit 210 to apply an operation mode shifting signal to the adjacent slave BMS 200 in a relay manner.

For example, in the embodiment of FIG. 3, if the master light emitting unit 110 is turned on to shift the operation mode of the adjacent slave BMS 200, the slave light emitting unit 210 connected to the slave BMS 200 whose operation mode is shifted may be flickered. That is, since the slave light emitting unit 210 and the slave light receiving unit 220 of the adjacent slave BMS 200 are disposed at corresponding locations, the operation modes of the plurality of slave BMSs 200 may be shifted in series.

Also, when the control logic is implemented in software, the processor included in each BMS may be implemented as a set of program modules. At this time, the program modules may be stored in a memory device and executed by a processor.

In addition, there is no particular limitation on the types of various control logics of the processor, as long as one or more control logics are combined and the combined control logic is written in a computer-readable code system so that the computer-readable access is possible. As one example, the recording medium includes at least one selected from the group consisting of a ROM, a RAM, a register, a CD-ROM, a magnetic tape, a hard disk, a floppy disk and an optical data recording device. In addition, the code system may be stored and executed in a distributed manner on computers connected through a network. Moreover, functional programs, code and segments for implementing the combined control logics may be easily inferred by programmers in the technical field to which the present disclosure belongs.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

1: battery module
10: battery cell
100: master BMS
110: master light emitting unit
120: master light receiving unit
200: slave BMS 210: slave light emitting unit
220: slave light receiving unit

What is claimed is:

1. A battery management system (BMS) recognition system, comprising:
 a master BMS including a master light emitter, the master BMS being configured to flicker the master light emitter to transmit an operation mode shifting signal to a slave BMS when it is intended to shift an operation mode of the slave BMS; and
 a slave BMS including a slave light receiver configured to correspond to the master light emitter, the slave BMS being configured to:
  recognize the flickering of the master light emitter through the slave light receiver; and
  shift the operation mode thereof in response to the operation mode shifting signal.

2. The BMS recognition system according to claim 1, wherein:
 the master BMS further includes a plurality of master light emitters configured to correspond to slave light receivers of a plurality of slave BMSs, respectively; and
 the master BMS is further configured to flicker at least one master light emitter among the plurality of master light emitters to transmit the operation mode shifting signal to a corresponding slave BMS.

3. The BMS recognition system according to claim 1, wherein:
 the slave BMS further includes a slave light emitter; and
 when it is intended to transmit a failure situation to the master BMS when the failure situation occurs, the slave BMS is further configured to flicker the slave light emitter to transmit the failure situation to the master BMS.

4. The BMS recognition system according to claim 3, wherein:
 the master BMS further includes a master light receiver configured to correspond to the slave light emitter; and
 the master BMS is further configured to recognize the flickering of the slave light emitter through the master light receiver to perceive the failure situation of the slave BMS.

5. The BMS recognition system according to claim 1, wherein:
 the master BMS further includes a plurality of master light emitters respectively configured to correspond to slave light receivers of a plurality of slave BMSs; and
 the plurality of master light emitters are allocated with identification information to correspond to mounted locations of the plurality of slave BMSs.

6. The BMS recognition system according to claim 5, wherein the master BMS is further configured to flicker the plurality of master light emitters sequentially to allocate the identification information to the plurality of slave BMSs sequentially.

7. The BMS recognition system according to claim 6, wherein the master BMS is further configured to flicker the master light emitter to transmit an operation mode shifting signal including the identification information to the slave BMS.

8. The BMS recognition system according to claim 7, wherein the slave BMS is further configured to:
 check whether the identification information included in the operation mode shifting signal received through the slave light receiver is identical to the allocated identification information; and
 shift the operation mode in response to the operation mode shifting signal based on the checking result.

9. The BMS recognition system according to claim 1, wherein:
 the slave BMS includes a slave light emitter configured to correspond to a slave light receiver of an adjacent slave BMS; and
 when recognizing the flickering of the master light emitter and shifting the operation mode thereof in response to the operation mode shifting signal, the slave BMS is further configured to flicker the slave light emitter to apply an operation mode shifting signal to the adjacent slave BMS in a relay manner.

10. A battery pack, comprising the BMS recognition system according to claim 1.

11. A vehicle, comprising the BMS recognition system according to claim 1.

12. The BMS recognition method according to claim 7, further comprising:
 the slave BMS checking whether the identification information included in the operation mode shifting signal received through the slave light receiver is identical to the allocated identification information; and
 the slave BMS shifting the operation mode in response to the operation mode shifting signal based on the checking result.

13. The BMS recognition method according to claim 1, wherein:
 the slave BMS includes a slave light emitter configured to correspond to a slave light receiver of an adjacent slave BMS; and
 the method further comprises, when recognizing the flickering of the master light emitter and shifting the operation mode thereof in response to the operation mode shifting signal, the slave BMS flickering the slave light emitter to apply an operation mode shifting signal to the adjacent slave BMS in a relay manner.

14. A battery management system (BMS) recognition method, comprising:
 when it is intended to shift an operation mode of a slave BMS, transmitting an operation mode shifting signal to the slave BMS by flickering a master light emitter;
 recognizing the flickering of the master light emitter through a slave light receiver configured to correspond to the flickering of the master light emitter; and
 shifting the operation mode in response to the operation mode shifting signal.

15. The BMS recognition method according to claim 14, wherein the transmitting an operation mode shifting signal includes transmitting an operation mode shifting signal to at least one slave BMS by flickering at least one master light emitter among a plurality of master light emitters configured to respectively correspond to slave light receivers of a plurality of slave BMSs.

16. The BMS recognition method according to claim 14, further comprising, when it is intended to transmit a failure situation to the master BMS when the failure situation occurs, the slave BMS flickering a slave light emitter of the slave BMS to transmit the failure situation to the master BMS.

17. The BMS recognition method according to claim 16, further comprising the master BMS recognizing the flickering of the slave light emitter, to perceive the failure situation of the slave BMS, through a master light receiver configured to correspond to the slave light emitter.

18. The BMS recognition method according to claim 14, wherein:
the master BMS includes a plurality of master light emitters respectively configured to correspond to slave light receivers of a plurality of slave BMSs; and
the plurality of master light emitters are allocated with identification information to correspond to mounted locations of the plurality of slave BMSs; and
the method further comprises the master BMS flickering the plurality of master light emitters sequentially to allocate the identification information to the plurality of slave BMSs sequentially.

19. The BMS recognition method according to claim 18, further comprising the master BMS flickering the master light emitter to transmit an operation mode shifting signal including the identification information to the slave BMS.

20. A battery management system (BMS) recognition system, comprising:
a master BMS including a master light source, the master BMS being configured to flicker the master light source to transmit an operation mode shifting signal to a slave BMS to signal a shift in an operation mode of the slave BMS; and
a slave BMS including a slave light sensor configured to correspond to the master light source, the slave BMS being configured to:
recognize the flickering of the master light source through the slave light sensor; and
shift the operation mode of the slave BMS in response to the operation mode shifting signal.

* * * * *